No. 731,421. PATENTED JUNE 23, 1903.
G. W. ANDERSON.
LAWN RAKE.
APPLICATION FILED NOV. 3, 1902.
NO MODEL. 2 SHEETS—SHEET 1.
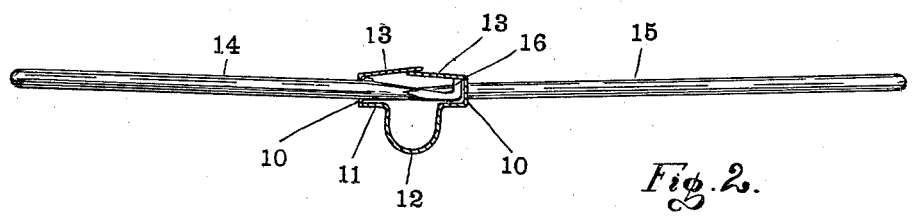
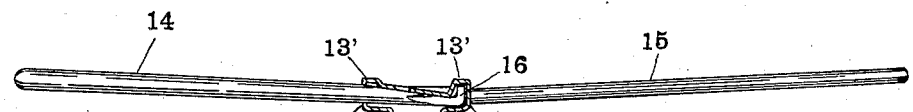
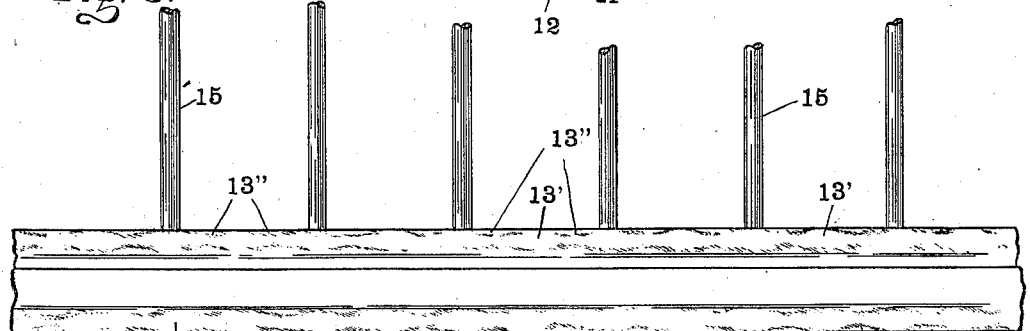
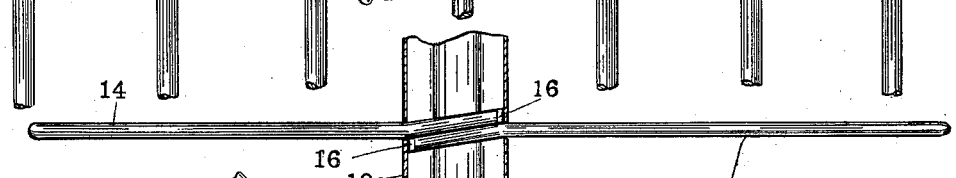
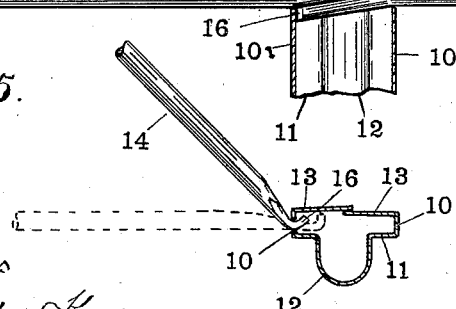
Witnesses
Adelaide Kearns.
J. A. Walsh.
Inventor
George W. Anderson
By
Bradford & Hood
Attorneys

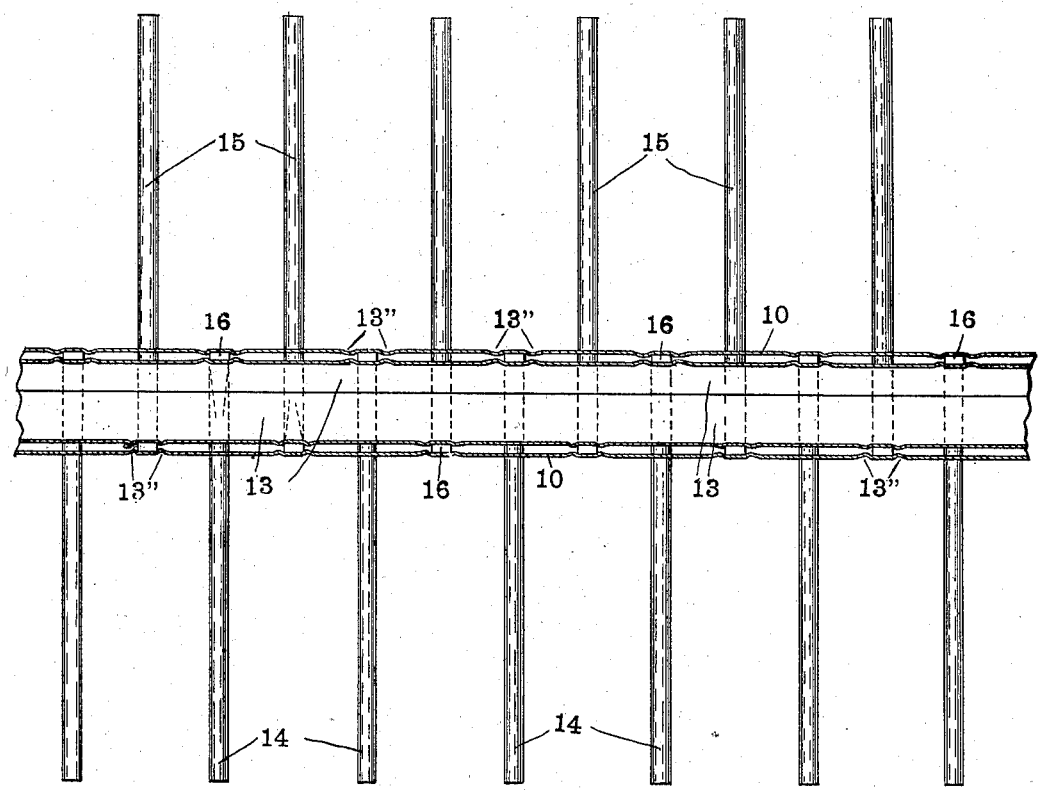

No. 731,421. Patented June 23, 1903.

UNITED STATES PATENT OFFICE.

GEORGE W. ANDERSON, OF LADOGA, INDIANA.

LAWN-RAKE.

SPECIFICATION forming part of Letters Patent No. 731,421, dated June 23, 1903.

Application filed November 3, 1902. Serial No. 129,828. (No model.)

*To all whom it may concern:*

Be it known that I, GEORGE W. ANDERSON, a citizen of the United States, residing at Ladoga, in the county of Montgomery and State of Indiana, have invented certain new and useful Improvements in Lawn-Rakes, of which the following is a specification.

The object of my invention is to produce from sheet metal a cross-bar or head for rakes in which one or two sets of teeth may be easily and rigidly secured, whereby a combined lawn and garden rake may be produced at small cost.

The accompanying drawings illustrate my invention.

Figure 1 is a transverse section of the rake having two sets of teeth placed in position ready to be secured to the head. Fig. 2 is a similar view showing the manner of securing the teeth in position. Fig. 3 is a plan. Fig. 4 is a sectional plan of a modified form in which the opposing teeth are placed in alinement. Fig. 5 is a detail sectional view showing the manner of introduction of the teeth, and Fig. 6 is a horizontal section.

The head consists of a piece of sheet metal folded to form a pair of practically parallel sides 10 10, which are connected by a back 11, which, if desired, may be provided with a corrugation or rib 12 for strength. Each side 10 is provided with a downturned lip 13, which lips, prior to the insertion of the teeth, are folded together, as shown in Figs. 1 and 5. The sides 10 are provided with perforations, through which are inserted the teeth 14 or 15, which may be of the same or different size, as desired. Each tooth 14 or 15 is provided at its inner end with an upturned finger 16, which is of a length substantially equal to the width of a side 10.

In operation after the head or cross-bar has been formed, as shown in Fig. 5, the teeth are inserted by introducing the finger 16 of a tooth through the desired opening in one or the other of sides 10, as shown in full lines in Fig. 5, and simultaneously swinging the outer end of said tooth downward and pushing inward, as indicated in dotted lines in said figure, and thereafter sliding the tooth inward until the finger 16 abuts against the opposite side 10, as shown in Figs. 1 and 2. After all of the teeth have been placed in position the lips 13 are forced downward, as shown in Fig. 2, so as to embrace the fingers 16 of the teeth. In addition to this the rib 13' thus formed is pinched along lines parallel to the teeth upon opposite sides of each finger 16, so as to form indentations 13", which thus serve to hold each tooth against lateral displacement.

In the form shown in Fig. 3 the two series of teeth 14 and 15 are staggered; but in case it is desired to have said teeth in substantial alinement I displace the inner end of each tooth transversely, one series to the right and the other series to the left, as indicated in Fig. 4, so that the exposed ends of the teeth may be in alinement, while the inner ends lying within the head will extend across said head obliquely.

By the construction described I am able to produce a very light yet extremely rigid rake in which the teeth are held against probable displacement.

I claim as my invention—

1. In a rake, a sheet-metal head provided with a pair of perforated sides, lips extending from said sides and folded toward each other and teeth extending through said perforations and each provided with a transverse finger which lies adjacent one of the sides, the said lips being depressed so as to embrace said fingers.

2. In a rake, a sheet-metal head provided with a pair of perforated sides, lips extending from said sides and folded toward each other and teeth extending through said perforations and each provided with a transverse finger which lies adjacent one of the sides, the said lips being depressed so as to embrace said fingers, and said lips being also pinched upon both sides of each tooth-finger.

3. A rake consisting of a metallic head having a pair of perforated sides, teeth each of which is provided at one end with a laterally-bent portion and at the end of said laterally-bent portion provided with a transverse finger to abut against one of the sides of the head, and a lip carried by each of the sides said lips being folded together and depressed upon the teeth so as to embrace the fingers thereof.

In witness whereof I have hereunto set my hand and seal, at Ladoga, Indiana, this 30th day of October, A. D. 1902.

GEORGE W. ANDERSON. [L. S.]

Witnesses:
H. E. DAUGHERTY,
J. J. OLIVER.